OR 2,675,521

X 1070 Y

SEARCH ROOM

April 13, 1954 P. R. GEOFFROY ET AL 2,675,521

METHOD OF GEOPHYSICAL EXPLORATION THROUGH THE USE OF BOREHOLES

Filed Oct. 1, 1952 4 Sheets-Sheet 1

INVENTORS
Paul-René Geoffroy
Theodore Koulomzine
BY
Pennie, Edmonds, Morton, Barrows & Taylor
ATTORNEY April 13, 1954 P. R. GEOFFROY ET AL 2,675,521
METHOD OF GEOPHYSICAL EXPLORATION THROUGH
THE USE OF BOREHOLES
Filed Oct. 1, 1952 4 Sheets-Sheet 2

FIG. 2

HORIZONTAL SECTION THROUGH EQUIPOTENTIAL SURFACES IN HOMOGENEOUS MEDIUM

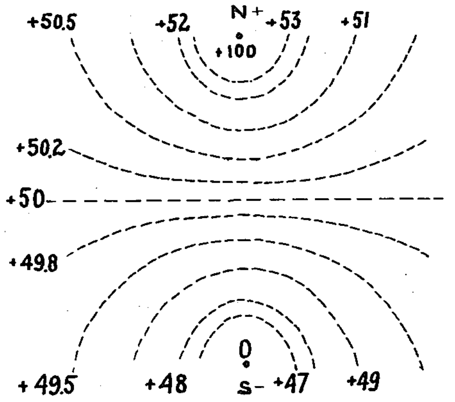

FIG. 3

VERTICAL SECTION THROUGH EQUIPOTENTIAL SURFACES IN HOMOGENEOUS MEDIUM

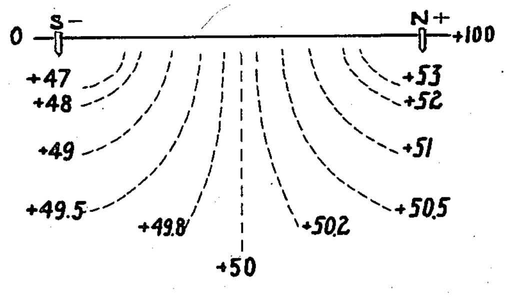

FIG. 4

HORIZONTAL SECTION THROUGH EQUIPOTENTIAL SURFACES DISTORTED BY CONDUCTIVE BODY LOCATED IN AREA BETWEEN HOLES

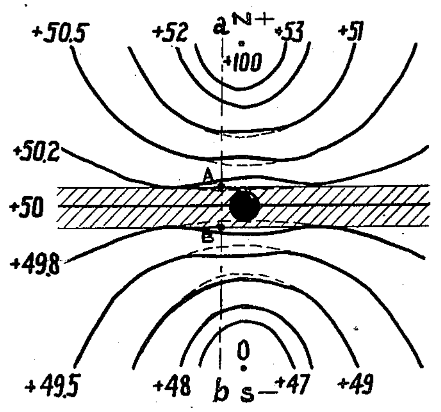

FIG. 5

VERTICAL SECTION THROUGH EQUIPOTENTIAL SURFACES DISTORTED BY CONDUCTIVE BODY LOCATED IN AREA BETWEEN HOLES

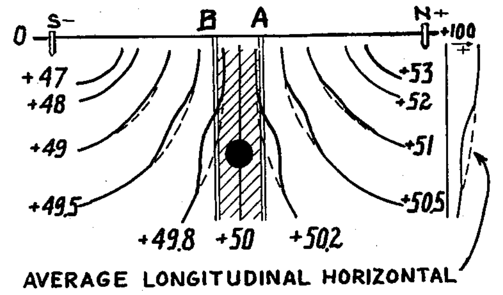

AVERAGE LONGITUDINAL HORIZONTAL INDUCED POTENTIAL GRADIENT PROFILE SHOWING ANOMALY IN FORM OF MINIMUM

INVENTORS
Paul René Geoffroy
Theodore Koulomzine
BY Pennie, Edmonds, Morton, Barrows & Taylor
ATTORNEY

FIG. 6

HORIZONTAL SECTION THROUGH EQUIPOTENTIAL SURFACES DISTORTED BY CONDUCTIVE BODY LOCATED NORTH OF HOLES

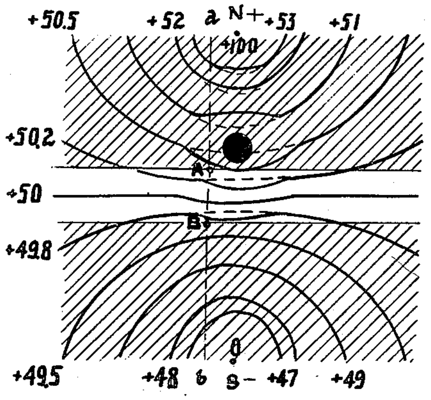

FIG. 7

VERTICAL SECTION THROUGH EQUIPOTENTIAL SURFACES DISTORTED BY CONDUCTIVE BODY LOCATED NORTH OF HOLES

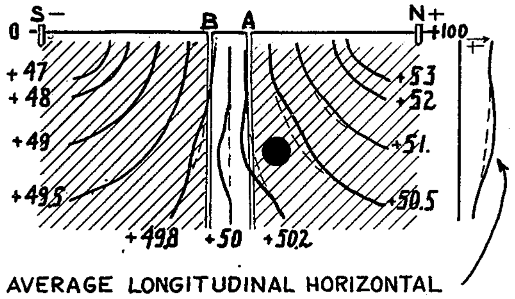

AVERAGE LONGITUDINAL HORIZONTAL INDUCED POTENTIAL GRADIENT PROFILE SHOWING ANOMALY IN FORM OF MAXIMUM

FIG. 8

HORIZONTAL SECTION THROUGH EQUIPOTENTIAL SURFACES DISTORTED BY CONDUCTIVE BODY LOCATED SOUTH OF HOLES

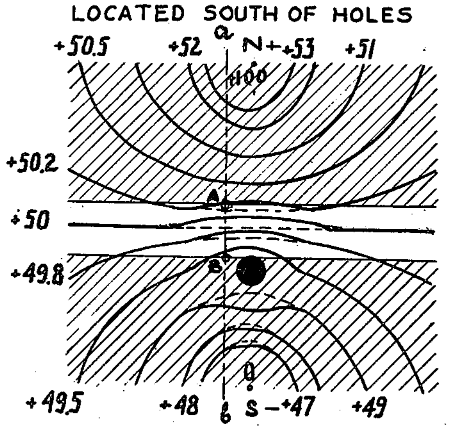

FIG. 9

VERTICAL SECTION THROUGH EQUIPOTENTIAL SURFACES DISTORTED BY CONDUCTIVE BODY LOCATED SOUTH OF HOLES

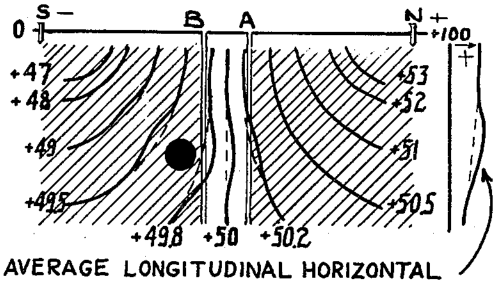

AVERAGE LONGITUDINAL HORIZONTAL INDUCED POTENTIAL GRADIENT PROFILE SHOWING ANOMALY IN FORM OF MAXIMUM

INVENTORS
Paul Rene Geoffroy
Theodore Koulomzine
BY
Pennie, Edmonds, Morton, Barrows & Taylor
ATTORNEY April 13, 1954 P. R. GEOFFROY ET AL 2,675,521

METHOD OF GEOPHYSICAL EXPLORATION THROUGH THE USE OF BOREHOLES

Filed Oct. 1, 1952 4 Sheets-Sheet 4

FIG. 10

HORIZONTAL SECTION THROUGH EQUIPOTENTIAL SURFACES DISTORTED BY CONDUCTIVE BODY LOCATED IN SE (MIXED SIGN) QUADRANT

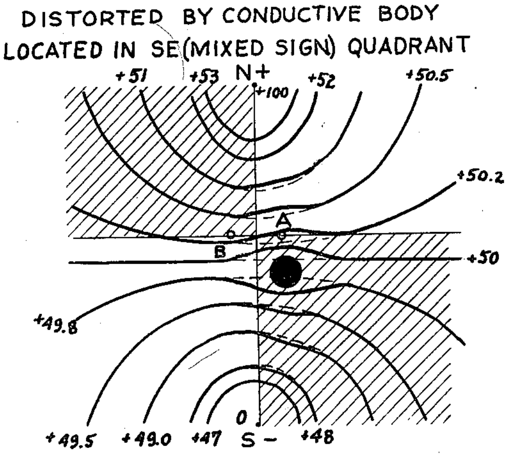

FIG. 11

HORIZONTAL SECTION THROUGH EQUIPOTENTIAL SURFACES DISTORTED BY CONDUCTIVE BODY LOCATED IN SW (SAME SIGN) QUADRANT

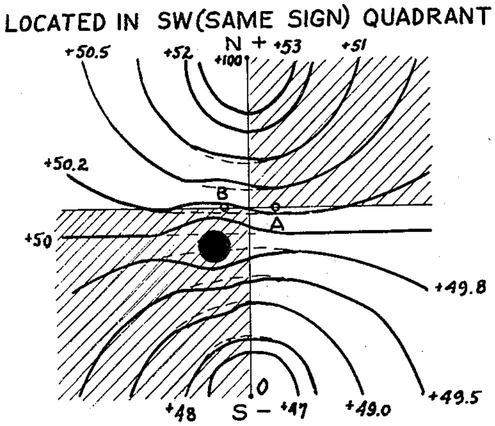

FIG. 12

SCHEMATIC PLAN SHOWING SECTIONS IN WHICH LOCATION OF CONDUCTIVE BODY MAY BE DETERMINED BY STUDY OF HORIZONTAL GRADIENTS

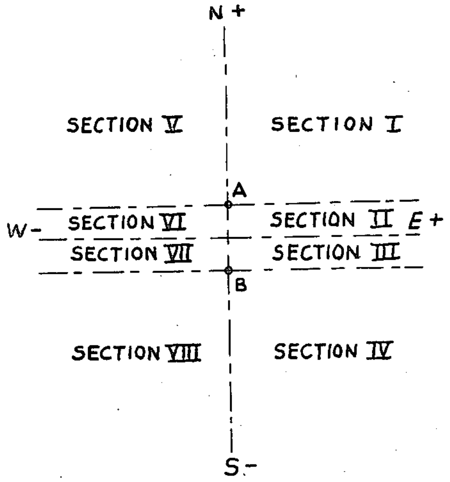

FIG. 13

VERTICAL SECTION THROUGH EQUIPOTENTIAL SURFACES DISTORTED BY CONDUCTIVE BODY

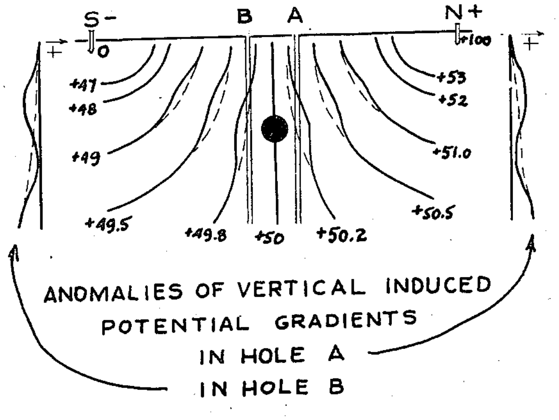

INVENTORS
Paul René Geoffroy
Theodore Koulomzine
BY
Pennie, Edmonds, Morton, Barrows & Taylor
ATTORNEY Patented Apr. 13, 1954 2,675,521

UNITED STATES PATENT OFFICE 2,675,521

METHOD OF GEOPHYSICAL EXPLORATION THROUGH THE USE OF BOREHOLES

Paul René Geoffroy and Theodore Koulomzine, Val d'Or, Quebec, Canada

Application October 1, 1952, Serial No. 312,596

5 Claims. (Cl. 324—1)

Figure 1:
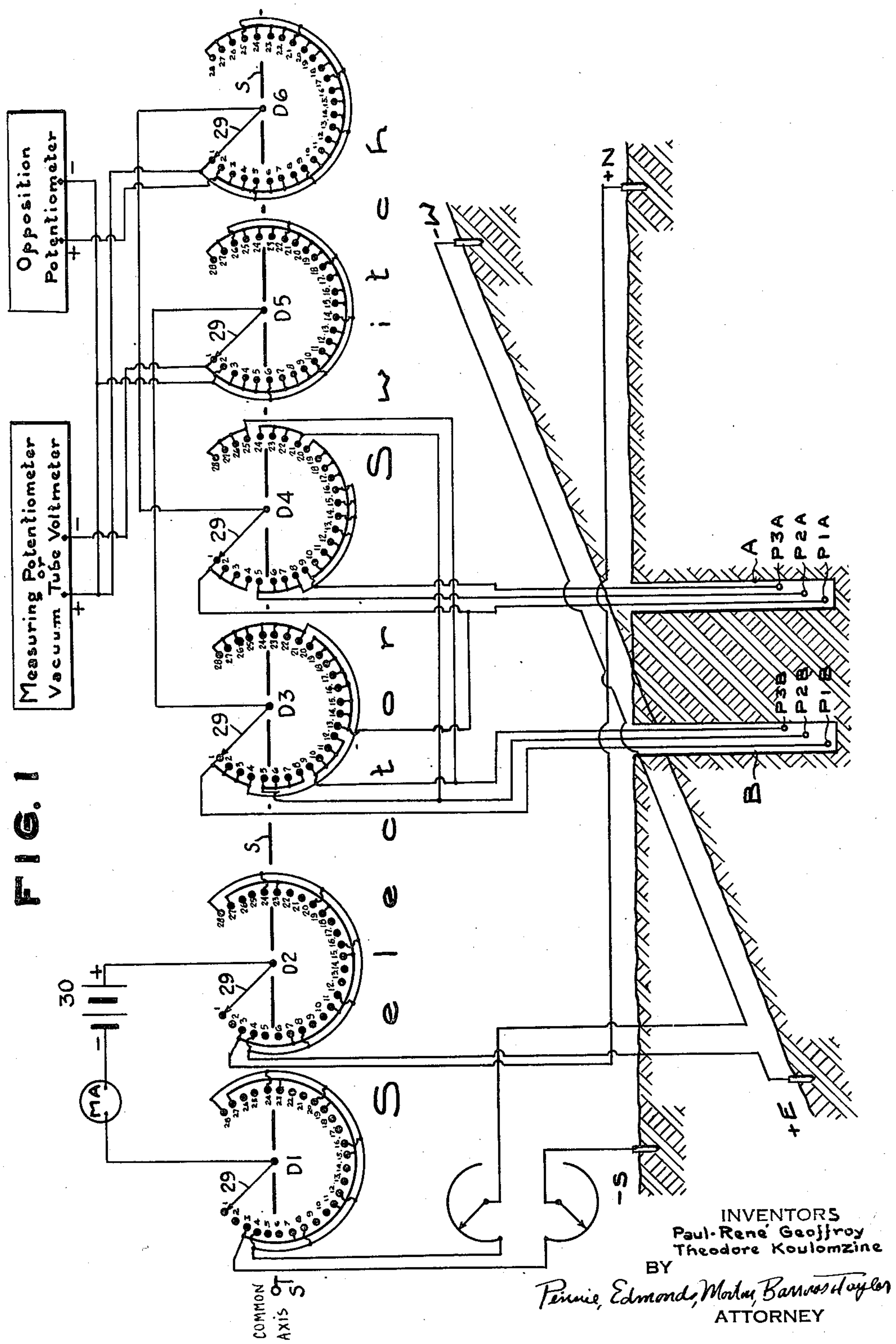

The present invention relates to electrical prospecting for ore deposits and particularly to electrical prospecting by utilizing diamond drill holes or other bore holes as a means of placing a minimum of two potential electrodes deep into the ground and thus exploring horizons not readily reached by present methods.

More specifically, the present invention deals with an improved method of making use of the quantities measured by geophysical methods based on the study of an induced electrical potential field produced by means of two current electrodes.

From a purely operational point of view, electrical prospecting, in so far as the electrical field is concerned, reduces itself to the measurement of three sets of magnitudes, namely:

| | |
|---|---|
| Differences of electrical potentials | ΔV |
| Intensities of currents | I |
| Metric vectors | L |

These measurements can be combined in a number of ways in order to obtain derivated magnitudes. It is the nature of a particular combination of measurements, as well as the operational and technological procedures involved to make them, with which this invention is concerned.

It has been customary heretofore to utilize electrodes lowered into bore holes and to use direct current or slowly alternating currents in making geophysical measurements in such holes. Hereinafter, for convenience, we shall refer to the use of direct current which is intended to cover an equivalent alternating current, such as a current having a frequency of less than 2 cycles per second. More particularly, this is an interrupted and inversed current.

In principle, the simplest way to use the measured magnitudes is to calculate the value of the electrical potential of the induced field, per unit of current, at a certain number of points distributed along a set of bore holes, and to relate the form of the equipotential surfaces thus defined to the geology of the subsoil. The drawback of this method is that those surfaces cannot be accurately defined when potentials can be measured only along widely separated lines such as drill holes. Accordingly, the specific distortions caused by certain types of heterogeneities of the ground would not be, in the majority of cases, recognizable.

Another system involves the so-called "apparent resistivity", i. e., the resistivity of an homogeneous ground which would give, between two potential electrodes, a difference of potential equal to that actually measured. It is expressed by:

$$\rho_a = K \times \frac{\Delta V}{I} \times F$$

where K is a numerical factor comprised between $2\pi$ and $4\pi$ and F is a "geometrical factor" involving the metric vectors that define the position of the two current electrodes and the two potential electrodes in relation to each other.

Where these vectors are very small, i. e., of the order of magnitude of a foot, the apparent resistivity calculated represents the true resistivity of the geological formation constituting the walls of the bore holes at each point of measurement along the hole. This method has been put to use long ago, particularly in oil fields, under the name of "electrical logging." But the method of apparent resistivity is not adequately effective for the search for conductive bodies, such as sulfide ore shoots, that may exist in the general vicinity of one or several bore holes but were missed by the said holes.

Theoretically, it would be possible to calculate the values of apparent resistivity at a series of points taken along a set of bore holes that would be found:

(*a*) When no conductive bodies are present, (*b*) When a given conductor is present, and thus solve the general problem we have in mind.

Practically, such calculations are extremely cumbersome and become impossible when the geological structure is complicated which is generally the case in a mining area.

Our invention provides a method of geophysical exploration which consists of inducing in the earth by means of direct current, a potential field and measuring through the use of a minimum of two bore holes the magnitude, direction and sign of induced potential gradients, and determining by these gradients the existence, if any, and the position in respect to the bore holes under investigation of an electrically conductive body located in the potential field in the vicinity of the drill holes.

In accordance with our invention, two electrodes through which we apply current to the ground (hereinafter called "current electrodes") are placed on the surface of the ground and the distance between them is very large compared to the other metric vectors involved. Two potential electrodes are simultaneously lowered, one in each of two adjacent bore holes, and differences of induced potentials are measured between these potential electrodes at varying depths along the holes under investigation.

If the distance $d$ between the two potential electrodes is relatively small, the derived magnitude $$G = \frac{\Delta V}{I} \times \frac{l}{d}$$

is practically equal to the induced potential gradient per unit of current at the point located halfway between the potential electrodes. If $d$ is somewhat larger, G represents the average induced potential gradient per unit of current between the two said electrodes.

At each point of a given bore hole, or at each point of a vertical line passing halfway between two adjacent holes, the gradient calculated is the sum of two gradients:

(*a*) The gradient which would be observed if no conductive body were present. Such a gradient varies continuously and slowly along a vertical axis.

(*b*) The gradient caused by the presence of a conductive body in the general vicinity of a bore hole, or a pair of holes.

The latter gradient (hereinafter termed the "anomalous gradient") will be observed only when passing the two potential electrodes in the proximity of a conductive body and will vary rather sharply.

A distinctive feature of our invention is the use of more than one set of induced potential gradients to determine the position of a conductive body in relationship to a given pair of drill holes. When the ground is electrified along the direction of the line joining the two holes, the gradient measured between two electrodes located in the two holes at the same level will be an "average horizontal longitudinal induced potential gradient." When the ground is electrified at right angles to the pair of holes, the gradient measured will be an "average horizontal transversal induced potential gradient." Finally, potential measurements made between electrodes located in the same hole will lead to the determination of "vertical induced potential gradients" of which there will be four, two for each hole, obtained respectively when the ground is electrified along the NS and the EW direction.

While it is true that the use of induced potential gradients obtained in any direction can lead to valuable information, we deem it advisable to particularly recommend the use of a system leading to the determination of a set of orthogonal gradients which are the longitudinal and the transversal gradients obtained in the horizontal plane, and the vertical gradients obtained in each hole.

It will be shown further on that a proper interpretation of the variations of the anomalous gradients leads to an accurate determination of the position of the perturbating body in respect to the holes surveyed.

A more detailed description of our method follows:

Referring to Fig. 1, let us consider two vertical bore holes A and B located on the ground along an axis NS. In order to make electrical measurements by our method, we place 4 current electrodes at a considerable distance from the holes and in such a manner that two current electrodes are in line with the bore holes, while two other current electrodes are placed at right angles to them. In Fig. 1, these current electrodes are designated respectively N, S and E, W. (These letters do not necessarily imply the geographical coordinates but can be any direction at right angles to each other. The N, S electrodes are lined up with the bore holes to be investigated, while the E, W electrodes are at right angles to the two bore holes. As it will be seen further on, it is important that the current electrodes be placed as far as practical from the bore holes under investigation, in order to insure in the area adjacent to the bore holes a normal induced potential field as uniform as possible, so that the distortions of this field due to the presence of a good conductor be clearly indicated. In practice, we found that if the current electrodes are placed away from the bore holes at a distance at least three times greater than the distance between these bore holes, the conditions necessary for a good investigation are satisfied.

The current we send into the ground through the current electrodes N, S and E, W is either a direct current or a slowly interruptd and inversed direct current, as mentioned above. This is done to avoid the formation of inductive currents and other phenomena that usually take place when alternating current of higher frequency is being sent into the ground. We believe that the use of direct current, or slowly interrupted current, provides results of a simpler nature which, therefore, are easier to interpret.

We send direct current successively and alternatively through the N, S electrodes and through the E, W electrodes, thus creating successively two potential fields, the vectors of which are at right angles. The potential fields that obtain in the ground are identical with those which have been utilized in the past for the measurement of resistivity or for the study of the equipotential lines on the surface of the ground. As has been shown mathematically by Maxwell, Schlumberger and others, in homogeneous ground the variations of the potential near the middle point between the two current electrodes are nearly uniform.

Figures 2 and 3 show the distribution of induced potentials in a homogeneous medium. If the potential at S is assumed to be zero and that at N +100, then the figures placed next to each equipotential surface shown on Figures 2 and 3 will correspond to the potentials obtaining on these surfaces. The uniformity of the potential field near the central part of each figure is readily visible.

An important feature of our method is the way we measure and use the variations of the induced potential. In an advantageous embodiment of our invention, we utilize three or more pickup or potential electrodes in each hole. These potential electrodes, shown in Fig. 1 as P1A, P2A, P3A and P1B, P2B and P3B, are lowered into the bore holes on well insulated electrical cables. The electrodes themselves consist either of porous non-polarizing electrodes or of simple electrolytic copper electrodes. Their shape can be varied to suit the conditions existing in the bore holes. It is important, however, that all the potential electrodes be made of the same material so as to avoid the formation of currents due to polarization. When applying the method to two holes, the electrode systems are lowered into the two parallel and adjacent holes and then pulled out simultaneously in such a manner as to remain at the same level at each time of reading the instruments. Suitable instruments, such as direct current potentiometers or vacuum tube voltmeters, are provided to measure the difference of potential between two electrodes located at the same level in the two adjacent holes and between the potential electrodes located at different levels in each individual hole.

By definition $\Delta V$, as used in our formula mentioned above, is:

$$\Delta V = V_1 - V_0$$

where $V_0$ is the natural difference of potential existing between two pickup potential electrodes even before any current is applied to the ground, while $V_1$ is the difference of potential which is measured after the ground has been electrified.

We have found it advantageous to eliminate the necessity of measuring $V_0$ by using a special opposition potentiometer by which we apply to the potential electrodes a difference of potential equal to the natural difference of potential but of opposite sign. The opposition potentiometer used for this purpose is nothing but an ordinary measuring potentiometer in which the resistances do not have to be graduated or calibrated.

If and when vacuum tube voltmeters are used for the measurement of differences of potential, it is possible to provide a calibration of the instrument so as to have the reading made directly proportionate to the average potential gradients. Furthermore, compensating means can be provided within the measuring instrument to annul the effect of the natural potentials and the normal gradients; thus the reading may be made directly proportionate to the anomalous average potential gradient.

Fig. 1 shows a wiring arrangement comprising a selector switch which enables us to send or stop sending at will the current applied to the current electrodes and send it alternatively through the N, S or the E, W circuits. Furthermore, the right-hand part of the selector switch enables us to choose the potential electrodes two by two so that the vertical, the longitudinal and the transversal gradients can be measured successively for each position of the electrodes in the holes. Also the switching arrangement provides a means of connecting the measuring and the opposition potentiometers in series or individually to the wires leading to the pair of potential electrodes between which the value of the average potential gradient is being determined.

The selector switch shown on Fig. 1 consists of six individual sections or "decks" mounted D1, D2, D3, D4, D5 and D6 which are securely connected together and provided with a common shaft S and movable connectors 29 which can be operated simultaneously and arranged to occupy the correspondingly numbered positions and in the same position in each deck of the selector switch. The two sections or decks D1 and D2 and shown on the left-hand side of the Fig. 1A distribute the current applied to the ground either cutting it off, as in the case of the first two positions of each group of four positions, i. e. in each of the positions numbered 1, 2, 5, 6, 9, 10, 13, 14, 17, 18, 21, 22, 25 and 26 shown on Fig. 1A, or sending it in a direction corresponding to positions: 3, 7, 11, 15, 19, 23 and 27 or in the EW direction corresponding to positions 4, 8, 12, 16, 20, 24 and 28. The two decks 3 and 4 shown in the middle of the figure serve to select the potential electrodes used in each desired combination of measurements. In the case of the first four positions (1, 2, 3, 4), potential electrodes P1A and P1B are connected to the measuring circuits, in the next four positions (5, 6, 7 and 8 of Fig. 1), it is the electrodes P2A and P2B that are used. In positions 9, 10, 11 and 12 potential electrodes P3A and P3B are connected to the potentiometers. In positions 13, 14, 15 and 16 it is the electrodes P1A and P2A that are connected. In positions 17, 18, 19 and 20 the potential electrodes P1A and P3A are connected. In positions 21, 22, 23 and 24 the electrodes P1B and P2B are connected. In positions 25, 26, 27 and 28 the electrodes P1B and P3B are connected. The seven groups of four positions each provide for all the potential combinations desired; i. e., potentials are measured between each of the following pairs of potential electrodes: P1A—P1B; P2A—P2B; P3A—P3B; P2A—P1A; P3A—P1A; P2B—P1B; P3B—P1B. Finally the decks D5 and D6 of the selector switch provide means for placing the measuring and the opposition potentiometers into the circuit. In each group of four positions, the first ones (i. e., positions 1, 5, 9, 13, 17, 21, and 25) serve to measure natural potentials; the second ones (i. e. positions 2, 6, 10, 14, 18, 22, and 26), to obtain the balancing of the natural potentials by the opposition potentiometer; the third positions of each group (i. e., positions 3, 7, 11, 15, 19, 23, and 27) are used to measure the induced potentials when the ground is being electrified in the NS direction, while the last or fourth positions of each group (i. e., positions 4, 8, 12, 16, 20, 24, and 28) are used to measure the induced potentials when the ground is electrified in the EW direction.

The combinations provided by the selector switch are therefore as follows:

| Position No. | Current | Potential Electrodes Connected | Potentiometer used | Objective of Measurement |
|---|---|---|---|---|
| 1 | off | +P1A—P1B | measuring | natural potential. |
| 2 | off | +P1A—P1B | opposition | neutralizing natural potential. |
| 3 | +N-S | +P1A—P1B | both | longitudinal gradient. |
| 4 | +E-N | +P1A—P1B | both | transversal gradient. |
| 5 | off | +P2A—P2B | measuring | natural potential. |
| 6 | off | +P2A—P2B | opposition | neutralizing natural potential. |
| 7 | +N-S | +P2A—P2B | both | longitudinal gradient. |
| 8 | +E-W | +P2A—P2B | both | transversal gradient. |
| 9 | off | +P3A—P3B | measuring | natural potential. |
| 10 | off | +P3A—P3B | opposition | neutralizing natural potential. |
| 11 | +N-S | +P3A—P3B | both | longitudinal gradient. |
| 12 | +E-W | +P3A—P3B | both | transversal gradient. |
| 13 | off | +P2A—P1A | measuring | natural potential. |
| 14 | off | +P2A—P1A | opposition | neutralizing natural potential. |
| 15 | +N-S | +P2A—P1A | both | N-S vert. grad. in A. |
| 16 | +E-W | +P2A—P1A | both | E-W vert. grad. in A. |
| 17 | off | +P3A—P1A | measuring | natural potential. |
| 18 | off | +P3A—P1A | opposition | neutralizing natural potential. |
| 19 | +N-S | +P3A—P1A | both | N-S vert. grad. in A. |
| 20 | +E-W | +P3A—P1A | both | E-W vert. grad. in A. |
| 21 | off | +P2B—P1B | measuring | natural potential. |
| 22 | off | +P2B—P1B | opposition | neutralizing natural potential. |
| 23 | +N-S | +P2B—P1B | both | N-S vert. grad. in B. |
| 24 | +E-W | +P2B—P1B | both | E-W vert. grad. in B. |
| 25 | off | +P3B—P1B | measuring | natural potential. |
| 26 | off | +P3B—P1B | opposition | neutralizing natural potential. |
| 27 | +N-S | +P3B—P1B | both | N-S vert. grad. in B. |
| 28 | +E-W | +P3B—P1B | both | E-W vert. grad. in B. |

In order to have adequate operation conditions, the difference of induced potential $\Delta V$ measured between two potential electrodes has to be large enough to be easily measured even though the natural potential $V_0$ is varying all the time under the influence of the so-called telluric currents.

We have found in practice that consistent measurements are obtained when differences of induced potential $\Delta V$ of the order of 10 to 100 millivolts are produced. To have such differences of potential, it is necessary to apply to the current electrodes a minimum of about 100 milliamperes; in fact, the more current used, the better the results will be. A total current flow of 500 milliamperes may be considered excellent. It must be emphasized though, that the amount of current that will flow through the ground will depend not only on the voltage applied to the current electrodes but also on the surface of contact of these electrodes. We found in practice that a minimum of 100 volts with adequate current electrodes consisting of a dozen copper or aluminum stakes is usually sufficient to produce the required 100 milliamperes of current to flow through the entire electrified field. The source of current 30 (Fig. 1A) can be either a direct current generator or any suitable form of battery.

The introduction of rheostats into the electrical circuits supplying the current electrodes serves to control the current. If I is made numerically equal to $1/d$, $\Delta V$ becomes equal to the gradient which greatly simplifies calculations.

When measurements are being made in two bore holes simultaneously, the induced potentials between electrodes P1A and P1B or P2A and P2B or P3A and P3B are measured, the average gradients obtained will be either the average longitudinal induced potential gradients when the current is being sent through the pair of electrodes located in line with the two given bore holes, or the average transversal induced potential gradients when the current is being sent through the two current electrodes located at right angles to the plane of the bore holes. The study of the potential field indicates that in homogeneous ground the transversal gradients will be normally zero at all depths along the drill holes, while the longitudinal gradients will be normally positive and will go on diminishing with depth. If the ground is not homogeneous and strong electrical conductors are present in the rock formations surrounding the bore holes, anomalous induced potential gradients will obtain, and if the average horizontal gradients that are measured between two parallel bore holes are plotted against depth, then the presence of a good conductive body, such as a sulphide ore body, will be indicated by the appearance of gradient anomalies along the gradient profile.

It can be further shown that if it is assumed that the anomaly of the gradients is caused by a conductive body, the study of the signs of the anomalies will give a good indication as to where such a conductive body should lie in relationship to the bore holes.

Assuming that the conductive body is, or can be, assimilated to a homogeneous sphere imbedded in a mass of homogeneously resistant rocks, the accurate distribution of the potentials and, therefore, of the induced potential gradients can be determined by the theory of electrical images be developed by Maxwell. On the other hand, without going through complicated mathematics, by simply studying the distortions of the shape of the equipotential surfaces produced by the presence of the conductive body.

Figs. 2 and 3, which have already been referred to above, show the distribution of equipotential surfaces in a homogeneous medium; Fig. 2 being a horizontal section and Fig. 3 a vertical section through the ground electrified by the current electrodes N and S. We have already mentioned that the potential field near the center of the area is rather uniform. This uniformity of the normal field is an important factor in the interpretation of the distortions of the potential field when a conductive body appears in the area because the appearance of anomalous gradients is readily recognizable. A uniform potential field near the center of the electrified area means that the induced potential gradient along the direction of the electrification should be almost constant in the central part of the area and that the two gradients at right angles to the above, which can be termed as the horizontal-transversal and the vertical gradients, are normally zero when there are no conductive bodies in the area.

Referring to Fig. 4, let us now assume that two vertical drill holes are placed along a line parallel to the line joining the two current electrodes N, S. Let us further assume that a perfect conductive body occupies a position in space somewhere between the two drill holes. More precisely, this would mean that the conductive body lies in the block of ground delimited on the north by a vertical plane passing through hole A and which is perpendicular to the NS direction, and, on the south, by a vertical plane passing through hole B and which is also perpendicular to the line NS. The area outlined above is shown in hatched pattern on Fig. 4. The ore body being a perfect conductor, all parts of it must be at the same electrical potential. Consequently, the effect produced by the superimposition of the conductor on the normal field is to spread out the equipotential surfaces. On Fig. 4, these spread-out equipotential surfaces are shown by the solid lines, whereas the dotted lines indicate the position the same equipotential surfaces should have occupied if there were no conductive bodies. The effect of the spreading of the equipotential surfaces is to reduce the difference of potential measured between electrodes P1A and P1B which have been lowered in the two holes A and B. If we refer back to the formula of the gradient, it becomes evident that the anomalous gradient, which, in this case, is the anomalous average longitudinal horizontal induced potential gradient, will also be smaller than normal. Thus, the presence of a conductive body anywhere between the two holes in the area designated by hatching on Fig. 4, leads to a gradient anomaly that takes the shape of a minimum of the average longitudinal horizontal induced potential gradient. This minimum will naturally occur at a depth corresponding to the depth of the body.

Fig. 5 represents a vertical section through the same setup along line $a$—$b$ of Fig. 4. It shows in a vertical section the effect produced by a conductive body located between two drill holes. On the right of the figure we have plotted a typical profile of the average longitudinal horizontal induced potential gradient, with the values of the gradient plotted against the depth at which each measurement was taken. The positive values of the gradient are plotted towards the right. The dotted line represents the normal gradient which would have been obtained if there were no conductive bodies present, while the solid line represents the actutal profile with a minimum of the longitudinal gradient appearing at the depth corresponding to the conductive mass.

Figs. 6, 7, 8, and 9, show the effects produced on the equipotential surfaces and therefore on the average longitudinal horizontal induced potential gradient when the conductive body lies not between the drill holes, but on the outside; in other words, when it is located either between the electrode N and a vertical plane passing through hole A, and which is perpendicular to line NS. The effect of the conductive body will be, as usual, to spread the equipotential surfaces and to push them towards the closest drill hole. Figs. 6, 7, 8, and 9, illustrate the conditions that will obtain both in horizontal and vertical sections. Once again, the dotted lines indicate the position the equipotential surfaces should have occupied if there were no conductive body, while the solid lines indicate the actual equipotential surfaces which have been spread out by the conductor. These figures illustrate the fact that the effect on the longitudinal gradient would be the same no matter whether the body be north of hole A or south of hole B; more equipotential surfaces will pass between the holes, therefore, there will be a greater difference of potential between the electrodes P/A and P/B and, consequently, a corresponding maximum of the average longitudinal horizontal induced potential gradient. On the right side of Figs. 7 and 8, we have plotted a normal, undisturbed, profile of the longitudinal induced potential gradient in the form of a dotted line, and in the form of a solid line the same gradient showing an anomalous maximum at the depth corresponding to the conductive mass.

Referring to Fig. 10, we are now going to study the conditions that will be created by the presence of a conductive body when the transversal gradients are being measured. Fig. 10 shows two drill holes A and B placed at right angles to the lines of current flowing between the surface electrodes N and S. Normally, when there is no disturbing conductive body, the two drill holes are located on the same equipotential surface; therefore, the average transversal horizontal induced potential gradient in homogeneous ground is zero. To study the effect of a conductive body on the transversal gradient we must decide on the conventional position for the negative and positive potential electrodes. On Figure 10 the positive potential electrodes are being lowered in hole A which lies on the east side from line NS, while the negative potential electrodes are lowered in hole B which lies to the west of line NS. The effect of any conductor located either in the southeast quadrant, as shown on Fig. 10, or in the northwest quadrant would be the same. In the first case a negative equipotential surface would be pushed towards the positive potential electrode, while in the second case a positive equipotential surface would be pushed towards the negative potential electrode located in the hole to the west. In both cases the resulting difference in the measured potential will be negative, and we are going to obtain a negative anomaly of the average transversal horizontal induced potential gradient whenever a conductor is either in the northwest or in the southeast quadrants, which have been shown on Fig. 10 by a hatched pattern.

Fig. 11 shows a similar setup of holes but the conductive body has been placed in the southwest quadrant. In this case a negative equipotential surface is being pushed towards the negative potential electrode. We will obtain, therefore, a positive difference of potential between the two electrodes placed in holes A and B, and as a result a positive anomaly of the average transversal horizontal induced potential gradient will appear on the profile at the depth corresponding to the conductor. The two quadrants in which a conductive body must lie to produce a positive anomaly of the average transversal horizontal induced potential gradient have been hatched on Fig. 11.

The combined rules of interpretation of the horizontal induced potential gradients can, therefore, be formulated as follows:

(1) If the longitudinal induced potential gradient profile plotted along the vertical for corresponding depths of the potential electrodes in the two holes under investigation shows an anomalous minimum, this would indicate that a conductive mass exists and is located between the drill holes or anywhere in an area delimited by two parallel planes passing through the drill holes and perpendicular to the line joining the current electrodes located on surface.

(2) If the longitudinal induced potential gradient profile plotted along the vertical for corresponding depths of the potential electrodes in the two holes under investigation shows an anomalous maximum, this would indicate that a conductive mass exists and is located outside the area delimited by two parallel planes passing through the drill holes and perpendicular to the line joining the current electrodes located on surface.

(3) If the transversal induced potential gradient profile plotted along the vertical for corresponding depths of the potential electrodes of the two holes under investigation shows a positive anomally, this would indicate that a conductive mass exists and is located in one of the quadrants formed by the same sign of current electrodes on surface and the potential electrodes in the hole. If we always use the N and the E electrodes for the positive, and the S and the W electrodes for the negative current stakes, and if we decide always to place the A hole on the N or the E side and use it for lowering the positive potential electrodes, then the quadrants formed by the same sign would be the NE and SW quadrants. They will be the quadrants formed either by both positive or both negative electrodes.

(4) If the transversal induced potential gradient profile plotted along the vertical for corresponding depths of the potential electrodes of the two holes under investigation shows a negative anomaly, this would indicate that a conductive mass exists and is located in one of the quadrants formed by the mixed signs of current electrodes on surface and potential electrodes in the holes. Using the same conventions as in (3) this would mean that the conductive mass would be located in the NW or SE quadrants.

As we undertake to make simultaneously or successively measurements of both the average longitudinal and transversal induced potential gradients by sending the currents successively in a direction parallel or at right angle to the pair of holes being investigated, the study of the anomalous gradients obtained will lead, through the application of the four rules enumerated above, to a determination of the position of the conductive mass in one of the eight sections shown on Fig, 12, which is nothing but a combination of areas outlined in rules (1) and (2) and hatched on Figures 4, 6, and 8, and of the quadrants referred to in rules (3) and (4) and shown by hatching on Figs. 10 and 11. If only the horizontal gradients are considered, an undetermination still exists as a conductive body located respectively in sections I or VIII, IV or V, II or VII and III or VI, would produce identical combinations of longitudinal and transversal induced potential gradient anomalies. But, when the vertical induced potential gradients obtained individually in drill holes A and B are also considered, the undetermination is lifted, because, naturally, the vertical gradients corresponding to the conductive body will be more pronounced in the hole which passes closer to the conductive body.

Let us now study the case of the interpretation of the vertical induced potential gradients measured in one hole only. We always propose to measure the difference of the potential assuming the lower potential electrode in the hole to be negative, and we will consider the case of the electrode systems being lifted while the measurements are being taken. Fig. 13 illustrates the case of a conductive body located in the vertical plane and distorting equipotential surfaces. A careful analysis of the phenomena will lead to the conclusion that when a vertical drill hole cuts a series of equipotential surfaces sloping towards the positive surface current source, the resulting anomalies of the vertical induced potential gradient at that point would be positive. Similarly, when the hole will cut equipotential surfaces sloping towards the negative surface current source, a negative anomaly of the vertical induced potential gradient will be obtained. Furthermore, it becomes evident that if a vertical drill hole passes in the vicinity of a conductive body, the equipotential surfaces flowing around it will be cut by the drill hole first where they have one slope, then another. In other words, the anomaly of the vertical gradient measured should be in the form of a conjugated pair of a maximum and a minimum. Depending on whether the body is located towards the positive side from the drill hole, such as is on Fig. 13 the relative position of the body and hole B, the conjugated anomaly of the vertical gradient will present a maximum below and a minimum above the body. This is shown on the profile at the left-hand side of the figure, where, as usual, we have shown with a dotted line the undisturbed profile of the vertical gradient which would have been measured when no conductive body is present, while the solid line gives the shape of the anomalous vertical gradient caused by a conductive body lying to the positive side from the drill hole. Inversely, the profiles shown at the right-hand side of Fig. 13, illustrate the conditions that would be measured in hole A, in which case the body lies to the negative side from the hole.

The rules of the interpretation of the vertical gradients are as follows:

(5) If the first anomaly of the vertical induced potential gradient encountered while the potential electrodes are being raised is positive, the conductive body lies on the side of the positive current electrodes.

(6) Similarly, if while raising the electrode system the first conjugated anomaly of the vertical induced potential gradient is negative, the conductive body must lie on the side of the negative current electrode.

In our method we measure the vertical gradients simultaneously with horizontal induced potential gradients; furthermore, the vertical gradients are measured in each hole, with the current being sent successively in the NS and EW directions. It can be easily seen therefore, that the study of the vertical gradients obtained in individual bore holes will lead to the determination of the quadrant in which the conductive body must be expected.

Finally, a mathematical study done by us proves that the distance between the maximum and the minimum of the conjugated pair of anomalies of the vertical induced potential gradient is a function of the distance between the drill hole and the conductive mass.

From the discussion presented above and the rules of interpretation enumerated it is evident that our method of measuring the induced potential gradients in a pair of bore holes, when two electrical fields at right angles to each other have been created in the ground, leads to an almost complete determination of the location of a conductive body, if such a body exists, in the area of these two bore holes. If more than two drill holes can be utilized, the position of a conductive body located in the vicinity can be almost pinpointed. No other method of geophysical investigation from bore holes presently in use can claim such an achievement.

This application is a continuation-in-part of our application Serial No. 247,436, filed September 20, 1951, now abandoned.

We claim:

1. In locating an electrically conducting mineral body by geophysical measurements, the improved method which comprises inserting a potential electrode in each of at least two substantially parallel bore holes extending downward into the earth, moving the potential electrodes along the holes in such a manner as to keep the electrodes substantially at the same level while measurements are being performed, inserting one set of current electrodes in the earth at the surface of the ground along a line coinciding with or located closely to and substantially parallel to the line of intersection of the plane containing the two holes under investigation with the surface of the ground and placing each of these current electrodes at a distance from the holes which is greater than the distance between the holes, passing a direct current between the said current electrodes and measuring its intensity, taking at least two potential readings between the potential electrodes inserted in the two drill holes, one for each of two positions of the potential electrodes in the bore holes, then passing a direct current between two other current electrodes inserted in the earth at the surface of the ground along a line located halfway between the two holes and substantially at right angles to the line of intersection of the plane containing the two drill holes under investigation with the surface of the ground and placing each of these current electrodes at a distance from the holes which is greater than the distance between the holes and measuring the intensity of the current, taking at least two readings of potential between the potential electrodes inserted in the holes at different levels, and utilizing the potential and current readings thus made in determining the location of the mineral body.

2. In the method of claim 1, taking several potential readings between the potential electrodes while the current is being passed between the current electrodes parallel to the line joining the drill holes, and taking several potential readings between the potential electrodes while direct current is passed between the current electrodes at right angles to said line.

3. In the method of claim 1, reducing the potential readings obtained to the form of average induced potential gradients by controlling the current flow passing through the current electrodes so that it would be inversely proportionate to the distance between the potential electrodes inserted in the two adjacent holes beween which the differences of potential are being measured, plotting the average induced longitudinal horizontal potential gradients obtained when the current is sent along the plane parallel to the drill holes in the form of a profile where the depths of the potential electrodes in the drill holes are plotted along one coordinate and the gradient along the other, plotting the average induced transversal horizontal potential gradients obtained when the current is sent in a direction substantially at right angles to the plane joining the drill holes, and utilizing the profiles thus made in determining the location of a mineral body.

4. In the method of claim 1, complementing the measurements by taking potential readings between the potential electrodes inserted in each individual drill hole in order that the variations of the vertical induced potential gradients could be measured in conjunction with the potentials measured, and utilizing the potential and current readings thus made in determining the location of the mineral body.

5. In locating an electrically conducting mineral body by geophysical measurements, the improved method which comprises forming at least two spaced and substantially parallel bore holes downward into the earth, locating two pairs of current electrodes on lines substantially at right angles to each other and placed in the ground at the surface at a considerable distance from the two bore holes which is not less than three times the distance between the bore holes and not less than twice the depth of the bore holes, the lines joining each pair of current electrodes forming a rectangular cross the center of which is located halfway between the bore holes, one of said lines being parallel to a line joining the bore holes, by means of the two pairs of current electrodes successively inducing in the ground surrounding the bore holes two direct current electrical potential fields the lines of current of which are substantially at right angles to each other, moving progressively and simultaneously in each of the two bore holes a potential electrode, while the potential electrodes are at the same level in both holes measuring induced potentials therebetween, making at least six different induced potential gradient values which are the longitudinal and transversal horizontal gradients between the two holes as well as the two distinct sets of two vertical gradients obtained separately in each hole by sending the current successively between the two pairs of current electrodes and measuring the difference of potentials between the potential electrodes lowered in each bore hole separately.

References Cited in the file of this patent

UNITED STATES PATENTS

| Number | Name | Date |
|---|---|---|
| 2,345,608 | Lee | Apr. 4, 1944 |
| 2,440,693 | Lee | May 4, 1948 |
| 2,575,349 | Lee | Nov. 20, 1951 |
| 2,599,688 | Brandt | June 10, 1952 |

Certificate of Correction

Patent No. 2,675,521 April 13, 1954

Paul René Geoffroy et al.

It is hereby certified that error appears in the printed specification of the above numbered patent requiring correction as follows:

Column 2, lines 54 to 56, for $$\times\frac{1}{\mathrm{d}} \quad \text{read} \quad \times\frac{1}{d}$$

column 3, line 66, after "other." insert a closing parenthesis; column 4, line 9, for "interruptd" read *interrupted*; column 7, line 74, after "hand," insert *the results can be analyzed quite adequately,*; column 10, line 41, for "anomally" read *anomaly*;

and that the said Letters Patent should be read as corrected above, so that the same may conform to the record of the case in the Patent Office.

Signed and sealed this 8th day of June, A. D. 1954.

[SEAL]

ARTHUR W. CROCKER,
*Assistant Commissioner of Patents.*